(12) United States Patent
Saito

(10) Patent No.: US 6,807,653 B2
(45) Date of Patent: Oct. 19, 2004

(54) RECOVERY PATH DESIGNING CIRCUIT, METHOD AND PROGRAM THEREOF

(75) Inventor: Hiroyuki Saito, Tokyo (JP)

(73) Assignee: NEC Corporation (JP)

(*) Notice: Subject to any disclaimer, the term of this patent is extended or adjusted under 35 U.S.C. 154(b) by 2 days.

(21) Appl. No.: 10/298,315

(22) Filed: Nov. 15, 2002

(65) Prior Publication Data

US 2003/0097643 A1 May 22, 2003

(30) Foreign Application Priority Data

Nov. 16, 2001 (JP) ........................................ 2001-351627

(51) Int. Cl.$^7$ ............................................... G06F 17/50
(52) U.S. Cl. .............................. 716/2; 370/228; 716/1; 716/4; 716/5; 716/17
(58) Field of Search .............................. 370/228; 716/1, 716/2, 4, 5, 17

(56) References Cited

U.S. PATENT DOCUMENTS 6,215,763 B1 * 4/2001 Doshi et al. ................ 370/216

OTHER PUBLICATIONS

INFOCOM '97 (Apr. 1997) Restoration Strategies and Spare Capacity Requirement in Self–Healing ATM Networks of Yijun Xiong and Lorne Mason.

* cited by examiner

Primary Examiner—Thuan Do
(74) Attorney, Agent, or Firm—Ostrolenk, Faber, Gerb & Soffen, LLP

(57) ABSTRACT

A recovery path designing circuit, a method and a program thereof capable of reducing necessary resources as much as possible when designing a recovery path in a pre-establishing-type failure-detected end switching system. The recovery path designing circuit comprises an optimization standard making means to set an objective function for minimizing a link cost, a recovery path forming condition generating means, a link capacity calculating condition generating means, an accommodating condition generating means, and an optimizing means to solve integer programming problems expressed by the objective function and constraint expressions generated by those means, thus obtaining an optimum recovery path.

36 Claims, 2 Drawing Sheets

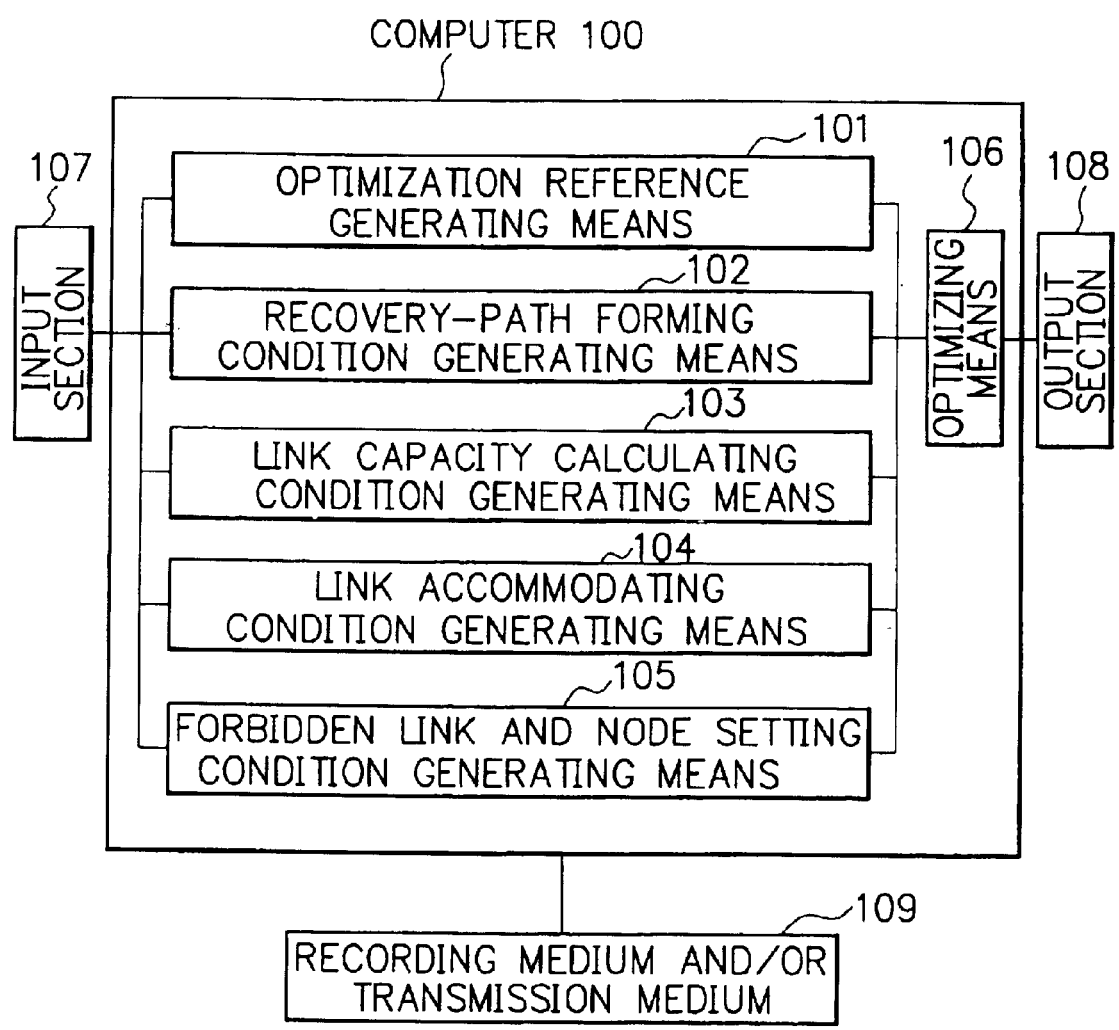
F I G. 3

RECOVERY PATH DESIGNING CIRCUIT, METHOD AND PROGRAM THEREOF

BACKGROUND OF THE INVENTION

The present invention relates to a recovery path designing circuit, a method and a program thereof for designing an alternative path in a pre-establishing-type failure-detected end switching system.

DESCRIPTION OF THE RELATED ART

As a conventional communication network designing method, for example, there has been proposed a recovery path designing method for a path end switching system in which a path is switched at the origin thereof by Yijun Xiong and Lorne Mason, "Restoration strategies and spare capacity requirements in self-healing ATM networks", INFOCOM'97, April 1997.

FIG. 1 is a diagram showing an example of a result of design obtained on the basis of the conventional designing method. In FIG. 1, reference marks n1 to n8 represent nodes, and reference marks p1 and p2 denote paths. The p1 is a primary path, and the p2 is a recovery path. Each line between adjacent two nodes represents a link. These links are expressed as link (n1, n2) and the like. While depicted with one line in FIG. 1, each link is bi-directional. For example, the link (n1, n2) includes two links in the opposite directions: from n1 to n2; and from n2 to n1. It should be noted that any number of links may be present between adjacent two nodes.

In this example in FIG. 1, the alternative path p2 is set for the primary path p1. In case of actual failure, the node n1 at one end of the path is informed of the failure, and switches the route from the primary path p1 to the alternative path p2. For example, when failure occurs on the link (n3, n4), the node n3 detects the failure and sends a message of the failure occurrence to the node n1. When receiving the message, the node n1 switches the route to the recovery path p2.

In the following, another prior arts related to the present invention are mentioned. In Japanese Patent Application Laid-Open No. 2000-22750, the applicant of the present invention has disclosed a technique, in a multipoint communication network designing method, to design a link capacity and a node capacity in a communication network on the premise of variation of traffic demands. This application does not directly teach, but touches on, the recovery path designing method for a pre-establishing-type failure detecting end switching system.

In Japanese Patent Application Laid-Open No. HEI 11-215124, the applicant has disclosed a technique to accommodate traffic even if demand patterns are changed to some extent.

In Japanese Patent Application Laid-Open No. 2001-36574, the applicant has disclosed a technique, when communication between an ingress node and an egress node of a network is performed on a communication line having tree structure, to build a communication link having tree structure with the minimum number of branches, which accommodates paths between a given entrance node and exit node.

Additionally, in Japanese Patent Application Laid-Open No. 2002-57676, the applicant has disclosed a technique to permit arbitrary communication within a given range by providing the amount of data traffic flowing in through an ingress node and the amount of data traffic flowing out from an egress node.

Compared to the path end switching system, in a failure-detected end switching system, there is no need to notify a failure occurrence because a node that has detected the failure switches a route, thus enabling faster failure recovery. However, a plurality of recovery paths are necessary for one primary path. Thereby, unless the recovery paths are set so as to effectively share the resources for recovery, a great amount of resources is to be required.

The method proposed by Yijun Xiong and Lorne Mason is premised on the path end switching system. In this method, it is impossible to design recovery paths on the basis of failure-detected end switching, and an efficient recovery path designing method has been sought.

SUMMARY OF THE INVENTION

It is therefore an object of the present invention to provide a recovery path designing circuit, a method and a program thereof capable of reducing necessary resources as much as possible when forming recovery paths on a pre-establishing-type failure-detected end switching system.

According to a first aspect of the present invention, for achieving the object mentioned above, there is provided a recovery path designing circuit for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating means for setting an objective function to minimize a link cost;

a recovery path forming condition generating means for generating a constraint expression to form a recovery path from a switching start node to an Egress node;

a link capacity calculating condition generating means for generating a constraint expression to calculate a link capacity required of the respective links;

a link accommodating condition generating means for generating a constraint expression to accommodate the link capacity within a range of a given link capacity;

a forbidden link and node setting condition generating means for generating constraint expressions to set at least one unavailable forbidden node and link with respect to each recovery path; and an optimizing means for solving integer programming problems expressed by the objective function set by the optimization reference generating means and constraint expressions generated by the recovery path forming condition generating means, the link capacity calculating condition generating means, the link accommodating condition generating means, and the forbidden link and node setting condition generating means.

According to a second aspect of the present invention, in the first aspect, the optimization reference generating means sets an objective function to minimize a link metric and a path metric in addition to the minimization of the link cost.

According to a third aspect of the present invention, there is provided a recovery path designing circuit for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating means for setting an objective function to minimize a maximum link load;

a recovery path forming condition generating means for generating a constraint expression to form a recovery path from a switching start node to an Egress node;

a link capacity calculating condition generating means for generating a constraint expression to calculate a link capacity required of the respective links and the maximum link load;

a link accommodating condition generating means for generating a constraint expression to accommodate the link capacity within a range of a given link capacity;

a forbidden link and node setting condition generating means for generating constraint expressions to set at least one unavailable forbidden node and link with respect to each recovery path; and an optimizing means for solving integer programming problems expressed by the objective function set by the optimization reference generating means and constraint expressions generated by the recovery path forming condition generating means, the link capacity calculating condition generating means, the link accommodating condition generating means, and the forbidden link and node setting condition generating means.

According to a fourth aspect of the present invention, in one of the first to third aspects, the link capacity calculating condition generating means generates a constraint expression to calculate, with respect to each state, a link capacity in the case where a primary path and a recovery path share their necessary resources.

According to a fifth aspect of the present invention, in one of the first to third aspects, the link capacity calculating condition generating means generates a constraint expression to calculate, with respect to each traffic, a link capacity in the case where recovery paths of one primary path share their necessary resources.

According to a sixth aspect of the present invention, in one of the first to third aspects, the link capacity calculating condition generating means generates a constraint expression to calculate a link capacity in the case where each of all paths is provided with dedicated resources.

According to a seventh aspect of the present invention, there is provided a recovery path designing method for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating step for setting an objective function to minimize a link cost;

a recovery path forming condition generating step for generating a constraint expression to form a recovery path from a switching start node to an Egress node;

a link capacity calculating condition generating step for generating a constraint expression to calculate a link capacity required of the respective links;

a link accommodating condition generating step for generating a constraint expression to accommodate the link capacity within a range of a given link capacity;

a forbidden link and node setting condition generating step for generating constraint expressions to set at least one unavailable forbidden node and link with respect to each recovery path; and an optimizing step for solving integer programming problems expressed by the objective function set at the optimization reference generating step and constraint expressions generated at the recovery path forming condition generating step, the link capacity calculating condition generating step, the link accommodating condition generating step, and the forbidden link and node setting condition generating step.

According to an eighth aspect of the present invention, in the seventh aspect, an objective function to minimize a link metric and a path metric is set at the optimization reference generating step in addition to the minimization of the link cost.

According to a ninth aspect of the present invention, there is provided a recovery path designing method for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating step for setting an objective function to minimize a maximum link load;

a recovery path forming condition generating step for generating a constraint expression to form a recovery path from a switching start node to an Egress node;

a link capacity calculating condition generating step for generating a constraint expression to calculate a link capacity required of the respective links and the maximum link load;

a link accommodating condition generating step for generating a constraint expression to accommodate the link capacity within a range of a given link capacity;

a forbidden link and node setting condition generating step for generating constraint expressions to set at least one unavailable forbidden node and link with respect to each recovery path; and an optimizing step for solving integer programming problems expressed by the objective function set at the optimization reference generating step and constraint expressions generated at the recovery path forming condition generating step, the link capacity calculating condition generating step, the link accommodating condition generating step, and the forbidden link and node setting condition generating step.

According to a tenth aspect of the present invention, in one of the seventh to ninth aspects, a constraint expression to calculate, with respect to each state, a link capacity in the case where a primary path and a recovery path share their necessary resources is generated at the link capacity calculating condition generating step.

According to an eleventh aspect of the present invention, in one of the seventh to ninth aspects, a constraint expression to calculate, with respect to each traffic, a link capacity in the case where recovery paths of one primary path share their necessary resources is generated at the link capacity calculating condition generating step.

According to a twelfth aspect of the present invention, in one of the seventh to ninth aspects, a constraint expression to calculate a link capacity in the case where each of all paths is provided with dedicated resources is generated at the link capacity calculating condition generating step.

According to a thirteenth aspect of the present invention, there is provided a computer-readable recovery path designing program for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, to have a computer execute:

an optimization reference generating process for setting an objective function to minimize a link cost;

a recovery path forming condition generating process for generating a constraint expression to form a recovery path from a switching start node to an Egress node;

a link capacity calculating condition generating process for generating a constraint expression to calculate a link capacity required of the respective links;

a link accommodating condition generating process for generating a constraint expression to accommodate the link capacity within a range of a given link capacity;

a forbidden link and node setting condition generating process for generating constraint expressions to set at least one unavailable forbidden node and link with respect to each recovery path; and an optimizing process for solving integer programming problems expressed by the objective function set in the optimization reference generating process and constraint expressions generated in the recovery path forming condition generating process, the link capacity calculating condition generating process, the link accommodating condition generating process, and the forbidden link and node setting condition generating process.

According to a fourteenth aspect of the present invention, in the thirteenth aspect, an objective function to minimize a link metric and a path metric is set in the optimization reference generating process in addition to the minimization of the link cost.

According to a fifteenth aspect of the present invention, there is provided a recovery path designing program for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, to have a computer execute:

an optimization reference generating process for setting an objective function to minimize a maximum link load;

a recovery path forming condition generating process for generating a constraint expression to form a recovery path from a switching start node to an Egress node;

a link capacity calculating condition generating process for generating a constraint expression to calculate a link capacity required of the respective links and the maximum link load;

a link accommodating condition generating process for generating a constraint expression to accommodate the link capacity within a range of a given link capacity;

a forbidden link and node setting condition generating process for generating constraint expressions to set at least one unavailable forbidden node and link with respect to each recovery path; and an optimizing process for solving integer programming problems expressed by the objective function set in the optimization reference generating process and constraint expressions generated in the recovery path forming condition generating process, the link capacity calculating condition generating process, the link accommodating condition generating process, and the forbidden link and node setting condition generating process.

According to a sixteenth aspect of the present invention, in one of the thirteenth to fifteenth aspects, a constraint expression to calculate, with respect to each state, a link capacity in the case where a primary path and a recovery path share their necessary resources is generated in the link capacity calculating condition generating process.

According to a seventeenth aspect of the present invention, in one of the thirteenth to fifteenth aspects, a constraint expression to calculate, with respect to each traffic, a link capacity in the case where recovery paths of one primary path share their necessary resources is generated in the link capacity calculating condition generating process.

According to an eighteenth aspect of the present invention, in one of the thirteenth to fifteenth aspects, a constraint expression to calculate a link capacity in the case where each of all paths is provided with dedicated resources is generated in the link capacity calculating condition generating process.

BRIEF DESCRIPTION OF THE DRAWINGS

The objects and features of the present invention will become more apparent from the consideration of the following detailed description taken in conjunction with the accompanying drawings in which:

FIG. 3 is a block diagram showing a configuration of a recovery path designing circuit according to embodiments of the present invention.

DESCRIPTION OF THE PREFERRED EMBODIMENTS

Figure 1:
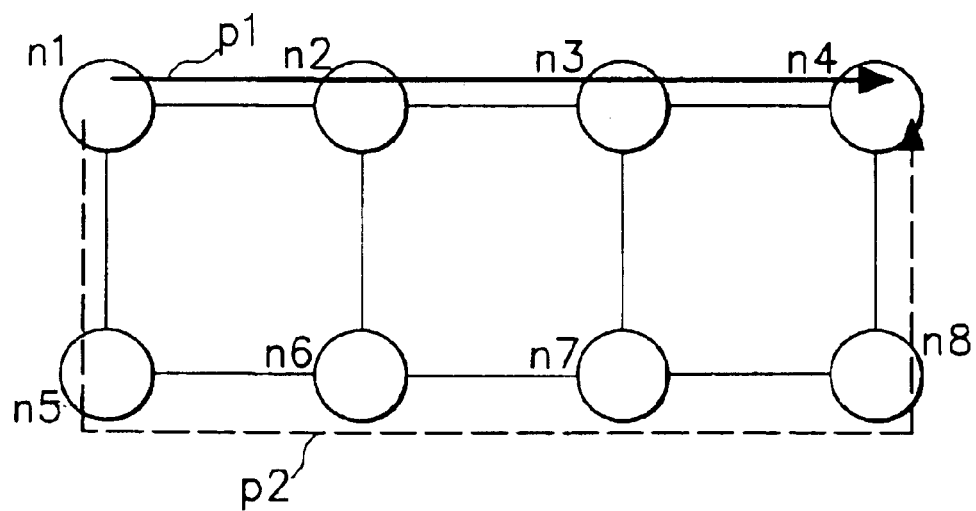
FIG. 1 is a diagram for explaining a conventional recovery path designing method.

Referring now to the drawings, embodiments of the present invention are explained in detail.

The present invention is intended to design an optimum recovery path on a pre-establishing-type (pre-registering type) failure-detected end switching system in which recovery paths are pre-established and a node that has detected a failure switches paths. First, an explanation is given of the pre-establishing-type failure-detected end switching system referring to FIG. 2.

Figure 2:
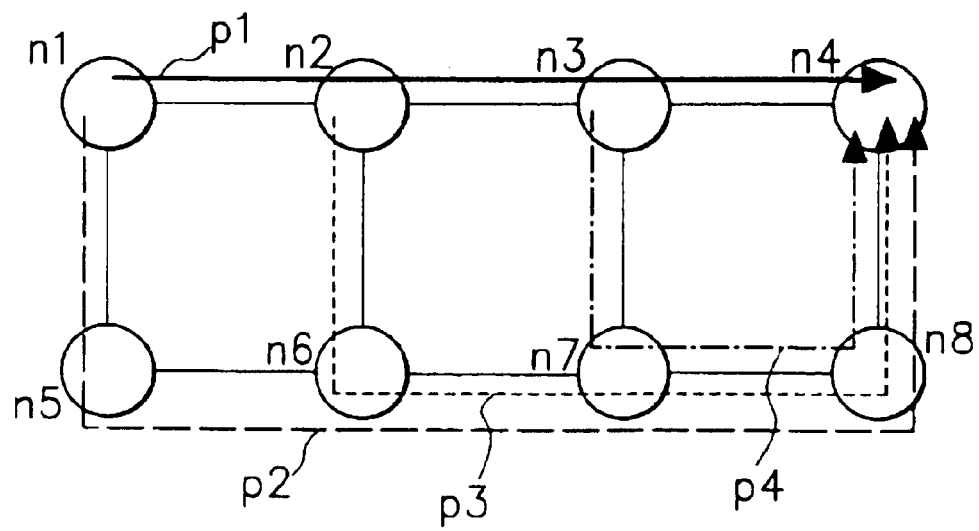
FIG. 2 is a diagram for explaining a failure recovery system based on a pre-establishing-type failure-detected end switching.

In FIG. 2, reference marks n1 to n8 denote nodes, and reference marks p1 to p4 represent paths. The p1 is a primary path, and the p2 to p4 are recovery paths. Each line between adjacent two nodes represents a link. These links are expressed as link (n1, n2) and the like. While depicted with one line in FIG. 2, each link is bi-directional. For example, the link (n1, n2) includes two links in the opposite directions: from n1 to n2; and from n2 to n1. Incidentally, any number of links may be present between adjacent two nodes.

In this example, the recovery paths p2 to p4 are set for the primary path p1 as countermeasure against a single node or link failure. For example, when the node n2 has a failure, the node n1 detects the failure and switches the path to the recovery path p2 to circumvent the failure point or section. For another example, when the link (n3, n4) (in the direction from the node n3 to node n4) has a failure, the node n3 detects the failure and switches the path to the recovery path p4.

In the pre-establishing-type failure-detected end switching system, there is a need to reserve resources for recovery paths such as a link capacity to realize reliable switching at the time of failure occurrence. To achieve the purpose, the resources for recovery paths may be shared.

For example, it is assumed that a resource "1" is required for each path. In FIG. 2, the primary path p1 requires a resource "1". In the case where the resources are not shared among recovery paths, resources "3" is required for the link (n7, n8) where the three recovery paths p2 to p4 for the primary path p1 pass. On the other hand, in the case where the resources are shared, only a resource "1" is required for the link (n7, n8). While only one primary path is depicted as an example in FIG. 2, necessary resources can be further reduced when resources for recovery paths prepared for different primary paths are shared. The link capacity is set through three approaches in which resources are; shared over a whole network; shared over recovery paths of the same primary path; and dedicated (not shared).

FIG. 3 is a block diagram showing a configuration of a recovery path designing circuit to design recovery paths for multipoint communication according to the present invention. The recovery path designing circuit comprises an optimization reference generating means 101, a recovery path forming condition generating means 102, a link capacity (per-user) calculating condition generating means 103, a link accommodating condition generating means 104, a forbidden link and node setting condition generating means 105, and an optimizing means 106. The optimizing means 106 solves a mathematical programming problem generated by the respective means 101 through 105 to derive multipoint communication service.

The recovery path designing circuit is included in a computer 100 to which an input section 107 such as a keyboard, and an output section 108 such as a display device are connected. Moreover, the computer 100 can mount a recording medium 109, and/or have a transmission medium 109 to allow the computer 100 to exchange programs and data with the other computer on a network.

The recording medium and/or transmission medium 109 may be a magnetic storage medium, an optical recording medium, a magnet-optical recording medium, a semiconductor IC recording medium such as a ROM or the other recording mediums, or a medium transmitted through the FTP, etc. via a network. In the medium 109, a program for making the computer 100 to function as a designing circuit for multipoint communication is recorded.

The program is read out by the computer 100 and controls the operation of the computer 100 to realize thereon the optimization reference generating means 101, the recovery path forming condition generating means 102, the link capacity calculating condition generating means 103, the link accommodating condition generating means 104, the forbidden link and node setting condition generating means 105, and the optimizing means 106.

In the following, an explanation is given of the operation of the recovery path designing circuit (recovery path designing method) according to the present invention. Here are shown embodiments in terms of the above-described three approaches, respectively.

First, an explanation is given of symbols used in the embodiments in common. These symbols are categorized into sets and elements, variables, and constants.

Each symbol indicates the respective sets and elements as follows:

N: the set of nodes;
$N_d$: the set of switching start nodes on a primary path currently operating at a traffic demand (nodes that switch routes to recovery paths), namely, the set of nodes on a primary path except an Egress node (since any nodes except for an egress node on a primary path have the possibility of switching to a recovery path); the respective elements are expressed as $n_d$, which may indicate a recovery path since a recovery path is set with respect to each switching start node;
$Z_{n_d}^{node}$: the set of nodes each of which is unavailable on a recovery path beginning from a switch start node $n_d$, namely, a node next to the node $n_d$ on a primary path;
$Z_{n_d}^{link}$: the set of links each of which is unavailable on a recovery path beginning from a switch start node $n_d$, namely, a link next to the node $n_d$ on a primary path;
L: the set of links; the respective elements are expressed as (i,j,k), which expresses the k-th link from a node i to a node j;
D: the set of traffic demands; the respective elements are expressed as d;
$t_d$: an Egress node at a traffic demand d; and
$w_d$: a primary path in operation at a traffic demand d.

Each symbol indicates the respective constants as follows:

$v_d$: a band required by a traffic demand d;
$c_{(i,j,k)}^{given}$: an upper limit of the link capacity of a link (i,j,k);
$\pi_{w_d}^{s}$: a constant taking the value of 1 when a primary path $w_d$ is used in state of s, and taking the value of 0 otherwise; this constant indicates whether or not a primary path is normally working, since a primary path is used as long as it is in order;
$\pi_{n_d}^{s}$: a constant taking the value of 1 when a recovery path $n_d$ is used in state of s, and taking the value of 0 otherwise, namely, taking the value of 1 when a failure occurs in the node or link next to the node $n_d$ on a primary path;
$g_{w_d}^{(i,j,k)}$: a constant taking the value 1 when a link (i,j,k) is used on a primary path $w_d$, and taking the value of 0 otherwise;
$a_{(i,j,k)}^{s}$: a link capacity (resources) used in state of s by a traffic demand for which paths have been set;
$a_{(i,j,k)}$: a link capacity (resources) required by a traffic demand for which paths have been set;

$$a_{(i,j,k)} = \max_{s \in S} a_{(i,j,k)}^{s}$$

$w_{(i,j,k)}$: a link cost per unit capacity;
$m_{(i,j,k)}$: a link metric, which expresses delay, distance, and the like; and
η: a coefficient for adding weight between a link cost and a path metric.

Each symbol indicates the respective variances as follows:

$x_{i,j,k}^{n_d}$: a 0–1 variance taking the value of 1 when a link (i,j,k) is used on a recovery path beginning from a switching start node $n_d$, and taking the value of 0 otherwise; namely, this variance indicates a flow in multi-commodity network flow problem;
$b_{(i,j,k)}$: a usage capacity of a link;
$b_{(i,j,k)}^{d}$: a capacity required by a traffic demand d in a link (i,j,k); and
φ: a maximum link load.

In the following, an explanation is given of embodiments of the present invention employing the above-described symbols.

[First Embodiment]

Hereat, an explanation is given of a case of sharing resources over a whole network as the first embodiment.

The optimization reference generating means 101 sets an objective function to minimize a link cost (a link capacity×a cost per unit capacity) as below.

$$\text{Minimize} \sum_{(i,j,k)\in L} w_{(i,j,k)} b_{(i,j,k)} \tag{1}$$

The recovery path forming condition generating means 102 generates a constraint expression for forming a recovery path from a switching start node to an Egress node as below.

$$\sum_{j,k(i,j,k)\in L} x^{n_d}_{(i,j,k)} - \sum_{j,k(j,i,k)\in L} x^{n_d}_{(j,i,k)} = \tag{2}$$

$$\begin{cases} 1 & i = n_d \\ 0 & i \ne n_d, t_d \quad (\forall\, i \in N, \forall\, n_d \in N_d, \forall\, d \in D) \\ -1 & i = t_d \end{cases}$$

The above expression (2) is based on the concept of network flow by Iri, Konno, and Tone, "Optimization Handbook". A flow of "1" is generated from a switching start node, and a flow of "1" is taken in an Egress node. The intermediate nodes store the flow. By this means, a path from the switching start node to the Egress node is formed.

The link capacity calculating condition generating means 103 generates a constraint expression for calculating a capacity (resources) necessary for respective links as below.

$$\sum_{d\in D}\sum_{n_d\in N_d} x^{n_d}_{(i,j,k)} \pi^s_{n_d} v_d + \sum_{d\in D} g^{(i,j,k)}_{w_d} \pi^2_{w_d} v_d + a^s_{(i,j,k)} \le \tag{3}$$

$$b_{(i,j,k)} \quad (\forall\, (i,j,k) \in L, \forall\, s \in S)$$

The constraint expression (3) is a formula for calculating a usage capacity of the respective links. The first term of the left side represents a capacity (resources) required for a primary path, and the second term thereof represents a capacity (resources) required for a recovery path(s). A point is to set the expression with respect to each state. In each state, such indicator constants as:

$$\pi^s_{w_d}, \pi^s_{n_d}$$

are used to add a link capacity of a path only. The other point is to take the maximum value in the right side, thereby realizing the sharing.

The link accommodating condition generating means 104 generates a constraint expression for accommodating a link capacity within a given range of a link physical band, etc. as below.

$$b_{(i,j,k)} \le c_{(i,j,k)}^{given} \quad (\forall(i,j,k)\in L) \tag{4}$$

The forbidden link and node setting condition generating means 105 generates constraint expressions lest each recovery path pass through a forbidden (unavailable) link(s) and node(s) (path(s)). First, the means 105 generates a constraint expression for an unavailable node as below.

$$\sum_{j,k:(i,j,k)} x^{n_d}_{(i,j,k)} = 0 \quad (\forall\, i \in Z^{link}_{n_d}, n_d \in N_d, \forall\, d \in D) \tag{5}$$

Subsequently, the means 105 generates a constraint expression for a forbidden link as below.

$$x_{(i,j,k)}^{n_d} = 0 \quad (\forall(i,j,k)\in Z^{link}_n, n_d\in N_d, \forall d\in D) \tag{6}$$

Basically, the condition that a next node is not to be used comprehends the condition that the next link is not to be used. However, when a switching start node is placed just before an Egress node, and when it is impossible to establish node-disjoint paths (paths that do not share the same nodes), etc., a condition such that the next link is not to be used is separately required in addition to the condition that the next node is not to be used.

Lastly, the optimizing means 106 solves the integer programming problem generated by the respective optimization reference generating means 101, the recovery path forming condition generating means 102, the link capacity calculating condition generating means 103, the link accommodating condition generating means 104, and the forbidden link and node setting condition generating means 105 to obtain a recovery path.

[Second Embodiment]

In the following, an explanation is given of a case where resources are shared over recovery paths of the same primary path as a second embodiment. The operation of the recovery path designing circuit according to this embodiment is the same as that of the first embodiment except for the operation of the link capacity calculating condition generating means 103.

The link capacity calculating condition generating means 103 generates constraint expressions for obtaining a capacity required for respective links as below.

$$\sum_{n_d\in N_d} x^{n_d}_{(i,j,k)} \pi^s_{n_d} v_d + \pi_{w_d} g^{(i,j,k)}_{w_d} v_d \le \tag{7}$$

$$b^d_{(i,j,k)} \quad (\forall\, d \in D, \forall\, (i,j,k)\in L, \forall\, s\in S)$$

$$\sum_{d\in D} b^d_{(i,j,k)} + a_{(i,j,k)} = b_{(i,j,k)} \quad (\forall\, (i,j,k)\in L) \tag{8}$$

In this embodiment, the above expression (7) is established to calculate a link capacity (resources) required by respective traffic demands because resources are shared only over recovery paths of the same primary path. The above expression (8) is to calculate a link capacity (resources) by adding up the link capacities obtained with respect to each traffic demand.

[Third Embodiment]

In the following, an explanation is given of a case where resources are dedicated (seized), that is, where each of all paths is provided with dedicated resources) as a third embodiment. The operation of the recovery path designing circuit according to this embodiment is the same as that of the first embodiment except for the operation of the link capacity calculating condition generating means 103.

The link capacity calculating condition generating means 103 generates a constraint expression for calculating a capacity required for respective links as follows.

$$\sum_{d\in D}\sum_{n_d\in N_d} x^{n_d}_{(i,j,k)} v_d + \sum_{d\in D} g^{(i,j,k)}_{w_d} v_d + a_{(i,j,k)} = \tag{9}$$

$$b_{(i,j,k)} \quad (\forall\, (i,j,k)\in L, \forall\, s\in S)$$

When resources are dedicated, resources corresponding to the link capacity of all paths are reserved regardless of failure states. Accordingly, the above expression (9) is established to calculate the whole resources (whole link capacity) by adding up the resources (link capacities) required for all the paths.

[Fourth Embodiment]

In the following, an explanation is given of a recovery path designing circuit according to the fourth embodiment. According to this embodiment, minimization of a path metric is realized in addition to the minimization of a link cost, which is realized in the respective first to third embodiments. In this embodiment, the optimization reference generating means 101 sets an objective function to minimize a path metric as below.

$$\text{Minimize} \sum_{(i,j,k) \in L} w_{(i,j,k)} b_{(i,j,k)} + \eta \sum_{d \in D} \sum_{n_d \in N_d} \sum_{(i,j,k) \in L} m_{(i,j,k)} x^{n_d}_{(i,j,k)} \quad (10)$$

With regard to the constraint expressions, the same constraint expressions as in the first to third embodiments can be employed. Namely, there can be used the constraint expressions respectively corresponding to the three kinds of approaches in which resources are: shared over a network; shared over recovery paths of the same primary path; and dedicated.

[Fifth Embodiment]

In the following, an explanation is given of a recovery path designing circuit according to the fifth embodiment of the present invention. In this embodiment, minimization of a max load on a link is realized to implement load sharing. The optimization reference generating means 101 sets an objective function to minimize the maximum value of a link load as below.

$$\text{Minimize} \phi \quad (11)$$

The link capacity calculating condition generating means 103 operates in three manners based on the above-described three approaches.

<Manner—1>

First, an explanation is given of a case where resources are shared over a network according to the first manner of the fifth embodiment. The link capacity calculating condition generating means 103 calculates a capacity (resources) required for respective links, and generates a constraint expression for calculating the maximum value of a link load as below.

$$\sum_{d \in D} \sum_{n_d \in N_d} x^{n_d}_{(i,j,k)} \pi^s_{n_d} v_d + \sum_{d \in D} g^{(i,j,k)}_{w_d} \pi^s_{w_d} v_d + a^s_{(i,j,k)} \leq \quad (12)$$

$$c^{given}_{(i,j,k)} \phi \quad (\forall\, (i, j, k) \in L, \forall\, s \in S)$$

<Manner—2>

In the second place, an explanation is given of a case where resources are shared over recovery paths of the same primary path according to the second manner of the fifth embodiment. The link capacity calculating condition generating means 103 calculates a capacity (resources) required for respective links, and generates constraint expressions for calculating a maximum link load as below.

$$\sum_{n_d \in N_d} x^{n_d}_{(i,j,k)} \pi^s_{n_d} v_d + \pi_{w_d} g^{(i,j,k)}_{w_d} v_d \leq \quad (13)$$

$$b^d_{(i,j,k)} \quad (\forall\, d \in D, \forall\, (i, j, k) \in L, \forall\, s \in S)$$

$$\sum_{d \in D} b^d_{(i,j,k)} + a_{(i,j,k)} = c^{given}_{(i,j,k)} \phi \quad (\forall\, (i, j, k) \in L) \quad (14)$$

<Manner—3>

Lastly, an explanation is given of a case where resources are dedicated according to the third manner of the fifth embodiment. The link capacity calculating condition generating means 103 generates a constraint expression for calculating a capacity (resources) required for respective links as below.

$$\sum_{d \in D} \sum_{n_d \in N_d} x^{n_d}_{(i,j,k)} v_d + \sum_{d \in D} g^{(i,j,k)}_{w_d} v_d + a_{(i,j,k)} = c^{given}_{(i,j,k)} \phi \quad (\forall\, (i, j, k) \in L) \quad (15)$$

In the fifth embodiment, along with the change of the placement of the variations, the link accommodating condition generating means 104 generates a constraint expression for accommodating the link capacity within a range of a given link capacity as below.

$$\phi \leq 1.0 (\forall (i,j,k) \in L) \quad (16)$$

With regard to the other constraint expressions, the same constraint expressions as in the first embodiment can be employed.

Incidentally, the above-described embodiments are examples of preferred embodiments of the present invention. Obviously, the present invention is not limited to the above embodiments, and modified embodiments may be implemented without departing from the scope of the present invention.

As set forth hereinbefore, according to the present invention, recovery paths can be designed on the pre-establishing-type failure detected end switching system. This is because recovery path problems for the pre-establishing-type failure-detected end switching system are solved as integer programming.

Especially when resources are shared over a primary path(s) and recovery paths, an accommodation rate at a traffic demand can be improved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A recovery path designing multipoint-to-point circuit for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating means for setting an objective function to minimize a link cost;

a recovery path forming condition generating means for generating a constraint expression to form a recovery path from a switching start node to an egress node;

a link capacity calculating condition generating means for generating a constraint expression to calculate a link capacity required of the respective links;

a link accommodating condition generating means for generating a constraint expression to accommodate the link capacity within a range of a given link capacity;

a forbidden link and node setting condition generating means for generating constraint expressions to set at least one unavailable forbidden node and link with respect to each recovery path; and an optimizing means for solving integer programming problems expressed by the objective function set by the optimization reference generating means and constraint expressions generated by the recovery path forming condition generating means, the link capacity calculating condition generating means, the link accommodating condition generating means, and the forbidden link and node setting condition generating means.

2. The recovery path designing circuit as claimed in claim 1, wherein the optimization reference generating means sets an objective function to minimize a link metric and a path metric in addition to the minimization of the link cost.

3. The recovery path designing circuit as claimed in claim 1, wherein the link capacity calculating condition generating means generates a constraint expression to calculate, with respect to each state, a link capacity in the case where a primary path and a recovery path share their necessary resources.

4. The recovery path designing circuit as claimed in claim 1, wherein the link capacity calculating condition generating means generates a constraint expression to calculate, with respect to each traffic, a link capacity in the case where recovery paths of one primary path share their necessary resources.

5. The recovery path designing circuit as claimed in claim 1, wherein the link capacity calculating condition generating means generates a constraint expression to calculate a link capacity in the case where each of all paths is provided with dedicated resources.

6. The recovery path designing circuit as claimed in claim 1, wherein:
the optimization reference generating means sets an objective function to minimize a link metric and a path metric in addition to the minimization of the link cost; and
the link capacity calculating condition generating means generates a constraint expression to calculate, with respect to each state, a link capacity in the case where a primary path and a recovery path share their necessary resource.

7. The recovery path designing circuit as claimed in claim 1, wherein:
the optimization reference generating means sets an objective function to minimize a link metric and a path metric in addition to the minimization of the link cost; and
the link capacity calculating condition generating means generates a constraint expression to calculate, with respect to each traffic, a link capacity in the case where recovery paths of one primary path share their necessary resources.

8. The recovery path designing circuit as claimed in claim 1, wherein:
the optimization reference generating means sets an objective function to minimize a link metric and a path metric in addition to the minimization of the link cost; and
the link capacity calculating condition generating means generates a constraint expression to calculate a link capacity in the case where each of all paths is provided with dedicated resources.

9. A recovery path designing multipoint-to-point circuit for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating means for setting an objective function to minimize a maximum link load;
a recovery path forming condition generating means for generating a constraint expression to form a recovery path from a switching start node to an egress node;
a link capacity calculating condition generating means for generating a constraint expression to calculate a link capacity required of the respective links and the maximum link load;
a link accommodating condition generating means for generating a constraint expression to accommodate the link capacity within a range of a given link capacity;
a forbidden link and node setting condition generating means for generating constraint expressions to set at least one unavailable forbidden node and link with respect to each recovery path; and
an optimizing means for solving integer programming problems expressed by the objective function set by the optimization reference generating means and constraint expressions generated by the respective recovery path forming condition generating means, the link capacity calculating condition generating means, the link accommodating condition generating means, and the forbidden link and node setting condition generating means.

10. The recovery path designing circuit as claimed in claim 9, wherein the link capacity calculating condition generating means generates a constraint expression to calculate, with respect to each state, a link capacity in the case where a primary path and a recovery path share their necessary resources.

11. The recovery path designing circuit as claimed in claim 9, wherein the link capacity calculating condition generating means generates a constraint expression to calculate, with respect to each traffic, a link capacity in the case where recovery paths of one primary path share their necessary resources.

12. The recovery path designing circuit as claimed in claim 9, wherein the link capacity calculating condition generating means generates a constraint expression to calculate a link capacity in the case where each of all paths is provided with dedicated resources.

13. A recovery path designing multipoint-to-point method for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating step for setting an objective function to minimize a link cost;
a recovery path forming condition generating step for generating a constraint expression to form a recovery path from a switching start node to an egress node;
a link capacity calculating condition generating step for generating a constraint expression to calculate a link capacity required of the respective links;
a link accommodating condition generating step for generating a constraint expression to accommodate the link capacity within a range of a given link capacity;
a forbidden link and node setting condition generating step for generating constraint expressions to set at least one unavailable forbidden node and link with respect to each recovery path; and an optimizing step for solving integer programming problems expressed by the objective function set at the optimization reference generating step and constraint expressions generated at the recovery path forming condition generating step, the link capacity calculating condition generating step, the link accommodating condition generating step, and the forbidden link and node setting condition generating step.

14. The recovery path designing method as claimed in claim 13, wherein an objective function to minimize a link metric and a path metric is set at the optimization reference generating step in addition to the minimization of the link cost.

15. The recovery path designing method as claimed in claim 13, wherein a constraint expression to calculate, with respect to each state, a link capacity in the case where a primary path and a recovery path share their necessary resources is generated at the link capacity calculating condition generating step.

16. The recovery path designing method as claimed in claim 13, wherein a constraint expression to calculate, with respect to each traffic, a link capacity in the case where recovery paths of one primary path share their necessary resources is generated at the link capacity calculating condition generating step.

17. The recovery path designing method as claimed in claim 13, wherein a constraint expression to calculate a link capacity in the case where each of all paths is provided with dedicated resources is generated at the link capacity calculating condition generating step.

18. The recovery path designing method as claimed in claim 13, wherein:
an objective function to minimize a link metric and a path metric is set at the optimization reference generating step in addition to the minimization of the link cost; and
a constraint expression to calculate, with respect to each state, a link capacity in the case where a primary path and a recovery path share their necessary resources is generated at the link capacity calculating condition generating step.

19. The recovery path designing method as claimed in claim 13, wherein:
an objective function to minimize a link metric and a path metric is set at the optimization reference generating step in addition to the minimization of the link cost; and
a constraint expression to calculate, with respect to each traffic, a link capacity in the case where recovery paths of one primary path share their necessary resources is generated at the link capacity calculating condition generating step.

20. The recovery path designing method as claimed in claim 13, wherein:
an objective function to minimize a link metric and a path metric is set at the optimization reference generating step in addition to the minimization of the link cost; and
a constraint expression to calculate a link capacity in the case where each of all paths is provided with dedicated resources is generated at the link capacity calculating condition generating step.

21. A recovery path designing multipoint-to-point method for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, comprising:

an optimization reference generating step for setting an objective function to minimize a maximum link load;
a recovery path forming condition generating step for generating a constraint expression to form a recovery path from a switching start node to an egress node;
a link capacity calculating condition generating step for generating a constraint expression to calculate a link capacity required of the respective links and the maximum link load;
a link accommodating condition generating step for generating a constraint expression to accommodate the link capacity within a range of a given link capacity;
a forbidden link and node setting condition generating step for generating constraint expressions to set at least one unavailable forbidden node and link with respect to each recovery path; and
an optimizing step for solving integer programming problems expressed by the objective function set at the optimization reference generating step and constraint expressions generated at the recovery path forming condition generating step, the link capacity calculating condition generating step, the link accommodating condition generating step, and the forbidden link and node setting condition generating step.

22. The recovery path designing method as claimed in claim 21, wherein a constraint expression to calculate, with respect to each state, a link capacity in the case where a primary path and a recovery path share their necessary resources is generated at the link capacity calculating condition generating step.

23. The recovery path designing method as claimed in claim 21, wherein a constraint expression to calculate, with respect to each traffic, a link capacity in the case where recovery paths of one primary path share their necessary resources is generated at the link capacity calculating condition generating step.

24. The recovery path designing method as claimed in claim 21, wherein a constraint expression to calculate a link capacity in the case where each of all paths is provided with dedicated resources is generated at the link capacity calculating condition generating step.

25. A recovery path designing multipoint-to-point program for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, to have a computer execute:
an optimization reference generating process for setting an objective function to minimize a link cost;
a recovery path forming condition generating process for generating a constraint expression to form a recovery path from a switching start node to an egress node;
a link capacity calculating condition generating process for generating a constraint expression to calculate a link capacity required of the respective links;
a link accommodating condition generating process for generating a constraint expression to accommodate the link capacity within a range of a given link capacity;
a forbidden link and node setting condition generating process for generating constraint expressions to set at least one unavailable forbidden node and link with respect to each recovery path; and
an optimizing process for solving integer programming problems expressed by the objective function set in the optimization reference generating process and constraint expressions generated in the recovery path forming condition generating process, the link capacity calculating condition generating process, the link accommodating condition generating process, and the forbidden link and node setting condition generating process.

26. The recovery path designing program as claimed in claim 25, wherein an objective function to minimize a link metric and a path metric is set in the optimization reference generating process in addition to the minimization of the link cost.

27. The recovery path designing program as claimed in claim 25, wherein a constraint expression to calculate, with respect to each state, a link capacity in the case where a primary path and a recovery path share their necessary resources is generated in the link capacity calculating condition generating process.

28. The recovery path designing program as claimed in claim 25, wherein a constraint expression to calculate, with respect to each traffic, a link capacity in the case where recovery paths of one primary path share their necessary resources is generated in the link capacity calculating condition generating process.

29. The recovery path designing program as claimed in claim 25, wherein a constraint expression to calculate a link capacity in the case where each of all paths is provided with dedicated resources is generated in the link capacity calculating condition generating process.

30. The recovery path designing program as claimed in claim 25, wherein:
an objective function to minimize a link metric and a path metric is set in the optimization reference generating program in addition to the minimization of the link cost; and
a constraint expression to calculate, with respect to each state, a link capacity in the case where a primary path and a recovery path share their necessary resources is generated in the link capacity calculating condition generating process.

31. The recovery path designing program as claimed in claim 25, wherein:
an objective function to minimize a link metric and a path metric is set in the optimization reference generating process in addition to the minimization of the link cost; and
a constraint expression to calculate, with respect to each traffic, a link capacity in the case where recovery paths of one primary path share their necessary resources is generated in the link capacity calculating condition generating process.

32. The recovery path designing program as claimed in claim 25, wherein:
an objective function to minimize a link metric and a path metric is set in the optimization reference generating process in addition to the minimization of the link cost; and
a constraint expression to calculate a link capacity in the case where each of all paths is provided with dedicated resources is generated in the link capacity calculating condition generating process.

33. A recovery path designing multipoint-to-point program for designing recovery paths in a multipoint communication network including a plurality of nodes and links that connect the nodes, which employs a pre-establishing-type failure-detected end switching system in which alternate paths for respective primary paths are pre-established and a node that has detected a failure switches the route from a primary path to a recovery path, to have a computer execute:
an optimization reference generating process for setting an objective function to minimize a maximum link load;
a recovery path forming condition generating process for generating a constraint expression to form a recovery path from a switching start node to an egress node;
a link capacity calculating condition generating process for generating a constraint expression to calculate a link capacity required of the respective links and the maximum link load;
a link accommodating condition generating process for generating a constraint expression to accommodate the link capacity within a range of a given link capacity;
a forbidden link and node setting condition generating process for generating constraint expressions to set at least one unavailable forbidden node and link with respect to each recovery path; and
an optimizing process for solving integer programming problems expressed by the objective function set in the optimization reference generating process and constraint expressions generated in the recovery path forming condition generating process, the link capacity calculating condition generating process, the link accommodating condition generating process, and the forbidden link and node setting condition generating process.

34. The recovery path designing program as claimed in claim 33, wherein a constraint expression to calculate, with respect to each state, a link capacity in the case where a primary path and a recovery path share their necessary resources is generated in the link capacity calculating condition generating process.

35. The recovery path designing program as claimed in claim 33, wherein a constraint expression to calculate, with respect to each traffic, a link capacity in the case where recovery paths of one primary path share their necessary resources is generated in the link capacity calculating condition generating process.

36. The recovery path designing program as claimed in claim 33, wherein a constraint expression to calculate a link capacity in the case where each of all paths is provided with dedicated resources is generated in the link capacity calculating condition generating process.

* * * * *